Oct. 5, 1954  D. F. REIS  2,690,925
SPEAR
Filed Nov. 30, 1951
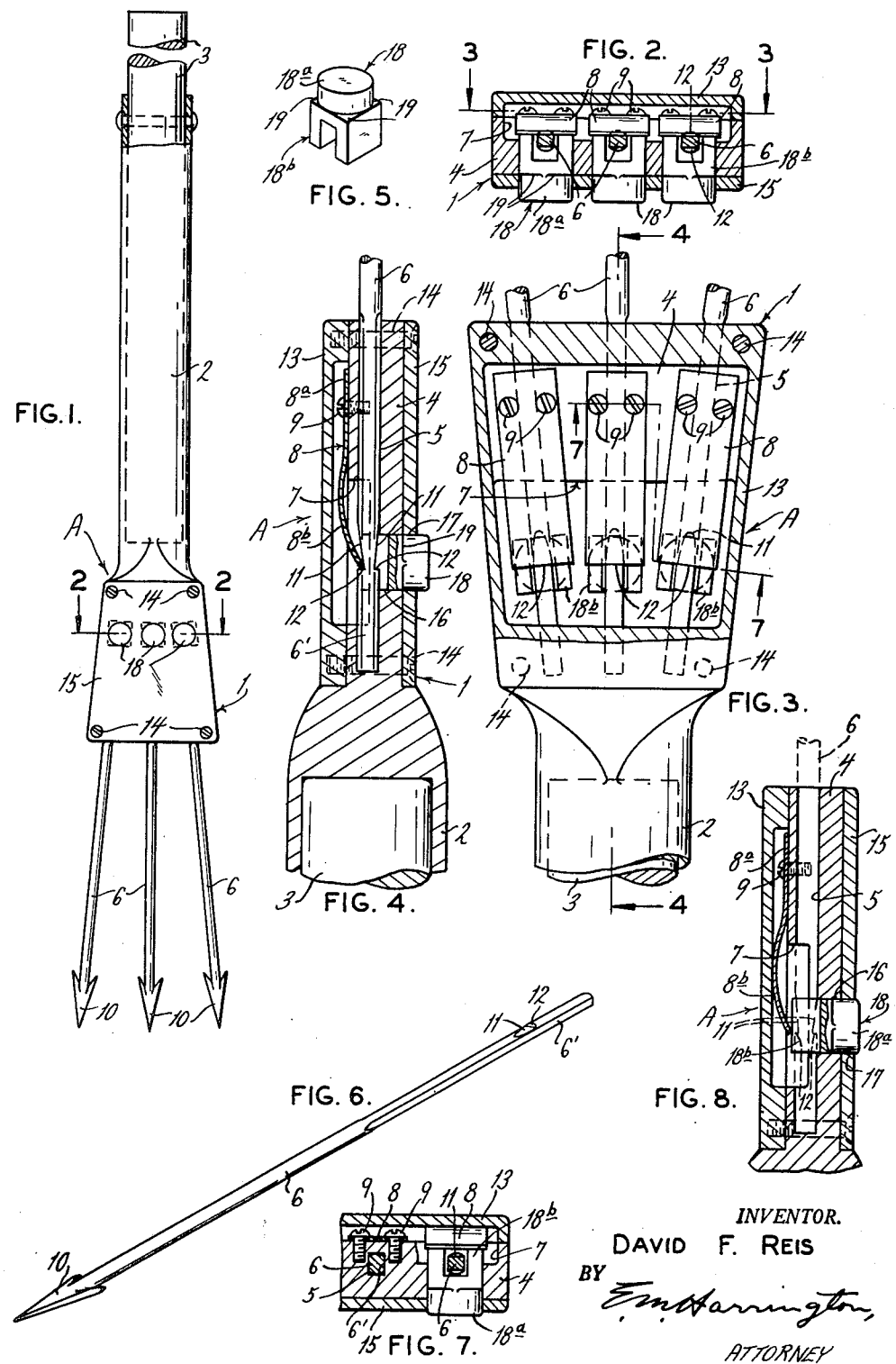
INVENTOR.
DAVID F. REIS
BY E. M. Harrington
ATTORNEY Patented Oct. 5, 1954

2,690,925

UNITED STATES PATENT OFFICE 2,690,925

SPEAR

David F. Reis, Washington, D. C.

Application November 30, 1951, Serial No. 259,170

6 Claims. (Cl. 294—61)

1

This invention relates generally to spears and more specifically to spears of the type adapted for use as harpoons and gigs, and other uses, including industrial and agriculture uses, the predominant object of the invention being to provide a spear having one or more prongs capable of being quickly and conveniently removed so as to permit a damaged or broken prong to be replaced by a new prong.

Fig. 1 is a front elevation of the improved spear of this invention, a part being shown in section and the handle of the spear being broken away.

Fig. 2 is an enlarged cross-section taken on line 2—2 of Fig. 1.

Fig. 3 is a fragmentary vertical section taken on line 3—3 of Fig. 2.

Fig. 4 is a vertical section taken on line 4—4 of Fig. 3.

Fig. 5 is a perspective view of a release button forming a part of the improved spear of this invention.

Fig. 6 is a perspective view of one of the prongs of the spear of this invention.

Fig. 7 is a fragmentary section taken on the staggered line 7—7 of Fig. 3.

Fig. 8 is a sectional view similar to Fig. 4 but showing parts of the improved spear in changed positions.

In the drawing, wherein is shown for purposes of illustration, merely, one embodiment of the invention, A designates the improved spear generally. The spear A comprises a head portion 1 from which is extended a tubular portion 2, as is shown to good advantage in Fig. 1. The tubular portion 2 may receive a handle 3 when the spear is intended for hand manipulation, or other means when the spear is to be otherwise used, such, for instance, as being fired from a gun as a harpoon.

The head 1 of the spear A includes an intermediate portion 4 which is shown in the drawing as having formed longitudinally thereof three openings 5 each of which receives an end portion of a prong 6, it being obvious, however, that spears may be made having more or less prongs than three, even one prong for certain purposes. By referring to Figs. 4 and 8 it will be noted that the intermediate portion 4 of the head 1 is cut away, as indicated by the reference character 7, so as to expose portions of the prong-receiving openings 5 for a purpose to be hereinafter set forth. Adjacent to the exposed portions of the openings 5 the intermediate portion 4 of the spear head 1 has secured thereto a plurality of leaf springs 8, there being one leaf spring for each

2 prong-receiving opening, and each leaf spring having a straight portion 8a which is secured by screws 9, or otherwise, to the intermediate portion of the spear head and a bowed portion 8b whose lower end portion projects slightly into the prong-receiving opening with which the leaf spring is associated.

By referring to Fig. 6 it will be noted that each spear 6 is provided with a piercing head 10, and that the shank of the spear is substantially round in cross-section for some distance inwardly of the piercing head. However, the shank of each spear is provided with opposed flat faces 6' which extend inwardly of said shank from the end of the prong opposite to the end thereof at which the piercing head 10 is located. Also, the shank of each prong is provided with a pair of opposed notches 11 which provide the prong shank with opposed shoulders 12. The head portion 1 of the spear A includes a recessed plate 13 which is secured to the intermediate portion 4 of said head portion by screws 14, or otherwise, and said plate serves as a cover plate for the head portion at the side thereof at which the leaf springs 8 are located. Also, at the opposite side of the head portion of the spear A a plate 15 is secured to the intermediate portion of the head portion by means of said screws 14, or otherwise.

Formed through the intermediate portion 4 of the head portion 1 of the spear A is a plurality of openings 16, one of said openings being related to each of said leaf springs 8. Additionally, a plurality of similar openings 17 are formed through the plate 15 and these openings 17 are alined with the openings 16. Each pair of related openings 16 and 17 receive a releasing button 18 which is shaped as is shown to good advantage in Fig. 5; that is to say, each button includes a portion 18a which is round in cross-section and projects through an opening 17 formed through the plate 15, and a bifurcated portion 18b. Attention is directed to the fact that at the junction of the portions 18a and 18b of each of the buttons 18 a plurality of corner shoulders 19 are provided, and these corner shoulders abut against portions of the inner face of the plate 15 so as to prevent outward displacement of the buttons with respect to the openings 16 and 17. Also, it is to be noted that the bifurcated portion of each button straddles the prong-receiving opening and the prong therein, to which said button is related, and portions of the inner edges of the legs of the bifurcated portion of the button contacts with portions of the related leaf spring 8.

When, in the use of the improved spear of this invention, a prong is broken, bent, or otherwise impaired and it is desired to replace such prong with a new prong, it is necessary, merely, that the button 18 related to the impaired prong be moved inwardly. This will move the lower end of the leaf spring 8 out of a notch 11 of the impaired prong and permit the impaired prong to be pulled out of its opening 5. The new prong is then introduced into the opening 5 from which the impaired prong was removed and said new prong is moved downwardly until the free end of the related leaf spring 8 snaps into a properly positioned notch 11 of the new prong whereby the new prong is securely fixed in place with respect to the head 1 of the spear.

I claim:

1. A spear comprising a hollow head portion, a prong projected from said head portion and provided with a shoulder, and means for releasably securing a portion of said prong in an opening portion provided therefor within said head portion, said means comprising a resilient element having a portion adapted to engage said shoulder of said prong, and a member supported by said head portion and operable from the interior of said head portion to disengage said resilient element portion from said shoulder.

2. A spear comprising a hollow head portion, a prong projected from said head portion and provided with a shoulder, and means for releasably securing a portion of said prong in an opening portion provided therefor within said head portion, said means comprising a resilient element having a portion adapted to engage said shoulder of said prong, and a member supported by said head portion and operable to disengage said resilient element portion from said shoulder.

3. A spear comprising a hollow head portion, a prong projected from said head portion and provided with a shoulder, and means for releasably securing a portion of said prong in an opening portion provided therefor within said head portion, said means comprising a resilient element supported within said head portion and having a portion adapted to engage said shoulder of said prong, and a member supported by said head portion and operable to disengage said resilient element portion from said shoulder.

4. A spear comprising a hollow head portion, a prong projected from said head portion and provided with a shoulder, and means for releasably securing a portion of said prong in an opening portion provided therefor within said head portion, said means comprising a leaf spring secured within said head portion and having a part adapted to engage said shoulder of said prong, and a member in the form of a push button supported by said head portion and operable to disengage said part of said leaf spring from said shoulder of said prong portions of said push button being located at opposite sides of said prong.

5. A spear comprising a hollow head portion, a prong projected from said head portion and provided with a shoulder, and means for releasably securing a portion of said prong in an opening portion provided therefor within said head portion, said means comprising a leaf spring secured within said head portion and having a part adapted to engage said shoulder of said prong, and a member in the form of a bifurcated push button supported by said head portion for actuation from the exterior thereof and operable to disengage said part of said leaf spring from said shoulder of said prong.

6. A spear comprising a hollow head portion, a plurality of prongs projected from said head portion, said prongs each being provided with a shoulder, and a plurality of means related to said prongs for releasably securing a portion of each of said prongs in an opening portion provided therefor within said head portion, said plurality of means comprising each a leaf spring secured within said head portion and having a part adapted to engage the shoulder of the related prong, and a bifurcated push button supported by said head portion spaced portions of which are located at opposite sides of the related prong and are in contact engagement with the related leaf spring and operable on movement thereof to disengage said part of said leaf spring from said shoulder of said prong.

References Cited in the file of this patent

UNITED STATES PATENTS

| Number | Name | Date |
|---|---|---|
| 172,312 | Hedges | Jan. 18, 1876 |
| 218,540 | Knowles | Aug. 12, 1879 |
| 395,454 | Prahar | Jan. 1, 1889 |
| 2,442,974 | Frederiksen | June 8, 1948 |
| 2,529,938 | Hearndon | Nov. 14, 1950 |
| 2,593,018 | Fendrock | Apr. 15, 1952 |

FOREIGN PATENTS

| Number | Country | Date |
|---|---|---|
| 309,683 | Great Britain | Apr. 18, 1929 |